United States Patent
Nakai

(10) Patent No.: US 6,885,289 B1
(45) Date of Patent: Apr. 26, 2005

(54) ONBOARD DEVICE ABNORMAL CONNECTION NOTIFICATION SYSTEM AND ONBOARD DEVICE

(75) Inventor: Yoshihiro Nakai, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 146 days.

(21) Appl. No.: 10/069,397

(22) PCT Filed: Jun. 27, 2000

(86) PCT No.: PCT/JP00/04212

§ 371 (c)(1),
(2), (4) Date: Feb. 26, 2002

(87) PCT Pub. No.: WO02/01527

PCT Pub. Date: Jan. 3, 2002

(51) Int. Cl.[7] .............................................. B60R 25/10
(52) U.S. Cl. .............. 340/426.1; 307/10.2; 340/426.34; 340/568.2; 340/687
(58) Field of Search ............................ 340/426.1, 425, 340/425.5, 426.34, 506, 568.2, 686.1, 687; 180/287; 307/10.2

(56) References Cited

U.S. PATENT DOCUMENTS

| | | | | |
|---|---|---|---|---|
| 4,806,926 A | * | 2/1989 | Nakamura | 340/5.31 |
| 5,107,244 A | * | 4/1992 | Minamide et al. | 340/426.34 |
| 5,349,326 A | * | 9/1994 | Yamada | 340/426.34 |
| 5,548,163 A | * | 8/1996 | French | 307/10.2 |
| 5,705,976 A | * | 1/1998 | Howard | 340/426.34 |
| 6,040,760 A | * | 3/2000 | Kataoka et al. | 340/425.5 |
| 6,107,929 A | * | 8/2000 | Amari | 340/687 |
| 6,339,696 B1 | * | 1/2002 | Chan et al. | 455/62 |

FOREIGN PATENT DOCUMENTS

| | | |
|---|---|---|
| JP | 8-268182 | 10/1996 |
| JP | 9-76880 | 3/1997 |
| JP | 9-330487 | 12/1997 |

* cited by examiner

*Primary Examiner*—Brent A. Swarthout
(74) *Attorney, Agent, or Firm*—Sughrue Mion PLLC

(57) ABSTRACT

An onboard device abnormal connection notification system is provided with: onboard devices (3a, 3b) which is connected to an in-vehicle network (5); a monitor means (1) which is connected to the in-vehicle network (5) for monitoring an abnormality in the state of connection between the onboard devices (3a, 3b) and the in-vehicle network (5); and a notification means (2) which is connected to the in-vehicle network (5) to notify an abnormality in connection of the onboard device (3a, 3b) based on a demand from the monitor means (1).

16 Claims, 15 Drawing Sheets

ONBOARD DEVICE ABNORMAL CONNECTION NOTIFICATION SYSTEM AND ONBOARD DEVICE

TECHNICAL FIELD

This invention relates to an onboard device abnormal connection notification system for notifying an abnormal connection of onboard (motor-vehicle-mounted) devices connected to a network inside a motor vehicle (hereinafter called "an in-vehicle network"), as well as to an onboard device.

BACKGROUND ART

FIG. 1 is a block diagram showing an arrangement of a conventional onboard device abnormal connection notification system as disclosed in JP-A 7-160955(1995). In the figure, reference numeral 101 denotes an audio visual (AV) source, reference numeral 102 denotes an alarm control apparatus, reference numeral 103 denotes a liquid crystal projector main body, reference numeral 104 denotes an alarm apparatus, reference numeral 105 denotes an audio cable, reference numeral 106 denotes a video cable, reference numeral 107 denotes a power cable from a battery, reference numeral 108 denotes a power cable to the liquid crystal projector main body 103, reference numeral 109 denotes an audio cable and reference numeral 110 denotes a multicore cable for supplying a video signal and a theft-detecting signal.

For example, should the liquid crystal projector main body 103 be attempted to be removed, the multicore cable 110 will also be cut off. Therefore, the alarm control apparatus 102 detects the abnormality and orders the alarm apparatus 104 to give an alarm based on the theft-detecting signal, whereby the alarm apparatus 104 sounds an alarm.

FIG. 2 is a schematic diagram showing an arrangement of a conventional onboard device abnormal connection notification system as disclosed in JP-A 8-268182(1996). In the figure, reference numeral 121 denotes a car audio main body, reference numeral 122 denotes a unit for a security apparatus, reference numeral 123 denotes an audio nose piece formed in a manner detachable relative to a front surface of the car audio main body 121 and reference numeral 124 denotes a similarly formed security nose piece. The audio nose piece 123 and the security nose piece 124 are constructed to be interchangeably mounted relative to the front surface of the car audio main body 121.

When a user of the motor vehicle leaves the motor vehicle, the audio nose piece 123 is detached and the security nose piece 124 is attached to the car audio main body 121. Should the door of the motor vehicle be forcibly opened, or a windshield thereof be broken, a sensor disposed in the security nose piece 124 detects the abnormality. The unit 122 for the security apparatus then sounds a siren to thereby perform theft-deterring of the onboard devices and the motor vehicle.

FIG. 3 is a perspective structural view showing an arrangement of a conventional theft-deterring system for onboard devices as disclosed in JP-A 9-330487(1997). In the figure, reference numeral 131 denotes a fixed panel. A smoked plate 132 is adhered to this fixed panel 131, and the entire front surface of an operation panel is covered by this smoked plate 132. On the rear side of this smoked panel 132, a display tube 134 mounted on a substrate 133 is disposed. On one side of the substrate 133 there are disposed a photo element 135 and a light-emitting diode (LED) 136.

By setting the smoked plate 132 slightly darker, when an ACC (accessory) which is the position of key to the motor vehicle is OFF, the display (segment or the like) of the display tube 134 on the inner side is hardly visible from the outside. It is thus possible to make believe at a glance that it does not function as an audio device. When the ACC of the motor vehicle is switched on, the display tube 134 emits light so as to become visible even through the smoked plate 132, whereby the user can see the display. In this manner, the theft-deterring is intended by causing the audio device invisible to the outside when the user leaves the motor vehicle.

As described in each of the above conventional examples, in the conventional onboard device abnormal connection notification system or in the conventional theft-deterring system, an abnormal connection notification or a theft-deterring is performed for each of the onboard devices.

However, recently, various types of onboard devices are offered such as not only audio devices but also navigation devices, television sets, car personal computers, or the like. As a result, the kinds of onboard devices available for use inside a motor vehicle increase.

Since the conventional onboard device abnormal connection notification or the theft-deterring system is arranged as described above, there are problems in that the cost becomes expensive because the abnormal connection notification systems or a theft-deterring systems are installed for respective onboard devices and further that a new abnormal connection notification system or a theft-deterring system is required when a new onboard device is to be installed, resulting in a waste.

This invention has been made to solve the above problems and has an object of providing an onboard device abnormal connection notification system as well as an onboard device which are capable of notifying a connection abnormality to a plurality of onboard devices with a single system and which are capable of being adapted when an onboard device is newly installed.

DISCLOSURE OF INVENTION

An onboard device abnormal connection notification system according to this invention comprises: an onboard device connected to an in-vehicle network; a monitor means connected to the in-vehicle network for monitoring an abnormality in a state of connection of the onboard device to the network; and a notification means connected to the in-vehicle network for notifying, based on a demand from the monitor means, the abnormality in the sate of connection of the onboard device.

According to this arrangement, there is obtained an effect in that a single system is able to perform a notification of an abnormality in connection of the onboard device connected to the in-vehicle network, and that this system is able to perform the notification of an abnormality in connection also in case a new onboard device is installed.

The system according to this invention is that the monitor means demands the onboard device to confirm the connection thereof to the in-vehicle network and, if there is no response from the onboard device within a lapse of a predetermined period of time, demands the notification means to notify the abnormality.

According to this arrangement, there is an effect in that the abnormality in connection of the onboard device connected to the in-vehicle network is notified.

The system according to this invention is that the monitor means demands the onboard device to confirm the connection thereof to the in-vehicle network at every predetermined period of time, and that the onboard device notifies the notification means of the abnormality in the state of connection of the monitor means if there is no demand for confirmation of connection from the monitor means at said every predetermined period of time.

According to this arrangement, there is an effect in that the abnormality in connection of the monitor means connected to the in-vehicle network is notified.

The system according to this invention further comprises a notification releasing means for temporarily releasing a notifying operation of the notification means.

According to this arrangement, there is an effect in that unnecessary notifying operation can be prevented when a new onboard device is added to the in-vehicle network or when an unnecessary onboard device is deleted from the network.

The system according to this invention is that a network identification (ID) for discriminating the in-vehicle network is registered in the monitor means and the onboard device, and that, when the onboard device is connected to the in-vehicle network to which the monitor means is connected, the onboard device obtains from the monitor means a network ID in the connected in-vehicle network, compares the registered network ID with the obtained network ID, and stops the operation of the onboard device if the two ID's are different from each other.

According to this arrangement, there is an effect in that the onboard device can be prevented from being wrongly used in another motor vehicle.

The system according to this invention is that the onboard device comprises a nonvolatile memory for registering therein the network ID.

According to this arrangement, there is an effect in that the onboard device holds the network ID to discriminate the in-vehicle network.

The system according to this invention is that, when a display device equipped with an input apparatus for inputting the network ID is connected to the in-vehicle network and when the network ID is inputted into the input apparatus, the display device notifies the inputted network ID to the monitor means, the notification means and the onboard device connected to the in-vehicle network.

According to this arrangement, a new network ID of the in-vehicle network is set to the onboard device, resulting in an enhanced secrecy of the network ID.

The system according to this invention is that a device number is set in advance to the onboard device connected to the in-vehicle network, that the onboard device grasps all the device numbers of onboard devices connected to the in-vehicle network, and that an onboard device, among the onboard devices to be connected to the in-vehicle network, having a smallest device number operates as the monitor means.

According to this arrangement, there is an effect in that the monitor means is automatically decided from the devices to be connected to the in-vehicle network.

The system according to this invention is that the monitor means demands the onboard device for confirmation of the connection to the in-vehicle network at every predetermined period of time and that, if there is no demand for confirmation of connection from the monitor means at said every predetermined period of time, an onboard device that has set thereto a smallest number exclusive of the device number of the monitor means among the onboard devices connected to the in-vehicle network operates as a new monitor means.

According to this arrangement, it is possible for all the onboard devices connected to the in-vehicle network to perform the monitoring operation. Therefore, there is an effect in that, even in case the monitor means gets out of order, the connection abnormality notification processing is continued.

The system according to this invention is that the network is wirelessly connected.

According to this arrangement, there is an effect in that the wiring for the in-vehicle network is not required.

The system according to this invention is that the onboard device comprises an interface (I/F) processing section for connection to the in-vehicle network, and that the I/F processing section is made of a wirelessly transmitting means.

According to this invention, there is an effect in that the wiring for the in-vehicle network is not required.

An onboard device connected to an in-vehicle network having connected thereto an abnormal connection notification means according to this invention is characterized in that, in order to notify to the notification means of an abnormality from a monitor means connected to the in-vehicle network, upon receipt of a demand for confirmation of connection to the in-vehicle network, a state of connection is confirmed and reported to the monitor means.

According to this arrangement, there is an effect in that the abnormality in connection of the onboard device connected to the in-vehicle network is performed by a single system and also that, in case an onboard device is to be newly installed, the notification of abnormality in connection is performed by this single system.

The onboard device according to this invention is that, if there is no demand for confirmation of connection from the monitor means at every predetermined period of time, the abnormality in the state of connection of the monitor means is notified to the notification means.

According to this arrangement, there is an effect in that the abnormality in connection of the monitor means connected to the in-vehicle network is notified.

The onboard device according to this invention is that a network ID for discriminating the in-vehicle network is registered, and that, when the onboard device is connected to the in-vehicle network to which is connected the monitor means having registered therein a network ID, the network ID of the connected in-vehicle network is obtained from the monitor means, the registered network ID is compared with the obtained network ID, and the operation of the onboard device is stopped if the two ID's are different from each other.

According to this arrangement, there is an effect in that the onboard device is prevented from being wrongly used in another motor vehicle.

The onboard device according to this invention further comprises a nonvolatile memory for registering the network ID.

According to this arrangement, there is an effect in that the onboard device holds the network ID for discriminating the in-vehicle network.

The onboard device according to this invention is that a device number set in advance to each of onboard devices connected to the in-vehicle network is grasped, and that a device, among the onboard devices to be connected to the in-vehicle network, having a smallest device number operates as the monitor means.

According to this arrangement, there is an effect in that the monitor means is automatically determined out of the onboard devices connected to the in-vehicle network.

The onboard device according to this invention is that, if there is no demand for confirmation of connection from the monitor means at said every predetermined period of time, an onboard device that has set thereto the smallest number exclusive of the device number of the monitor means among the onboard devices connected to the in-vehicle network operates as a new monitor means.

According to this arrangement, all the onboard devices connected to the in-vehicle network is capable of performing the monitoring operation as the monitor means. Therefore, there is an effect in that, even in case the monitor means gets out of order, the processing of notifying the abnormality in connection is continued.

The onboard device according to this invention further comprises an interface (I/F) processing section for connection to the in-vehicle network, and that the I/F processing section is made of a wirelessly transmitting means.

According to this arrangement, there is an effect in that the wiring for the in-vehicle network is not required.

BEST MODE FOR CARRYING OUT THE INVENTION

In order to describe this invention in more detail, a description will now be made about the best mode for carrying out this invention with reference to the accompanying drawings.

Embodiment 1

Figure 1:
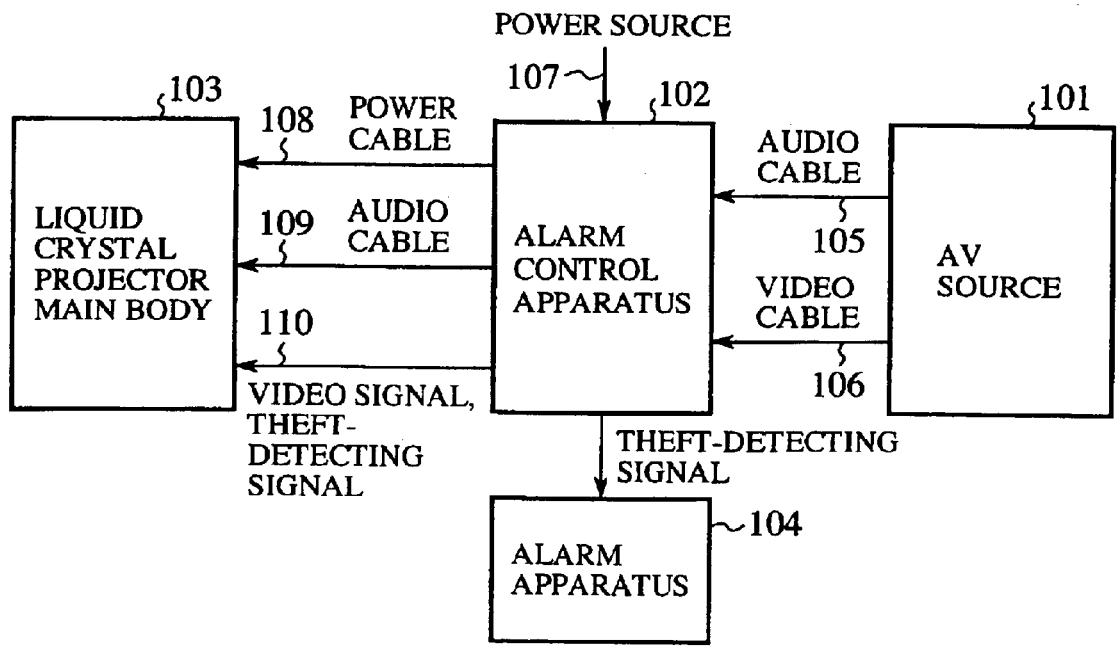
FIG. 1 is a block diagram showing an arrangement of a conventional onboard device abnormal connection notification system.
Figure 2:
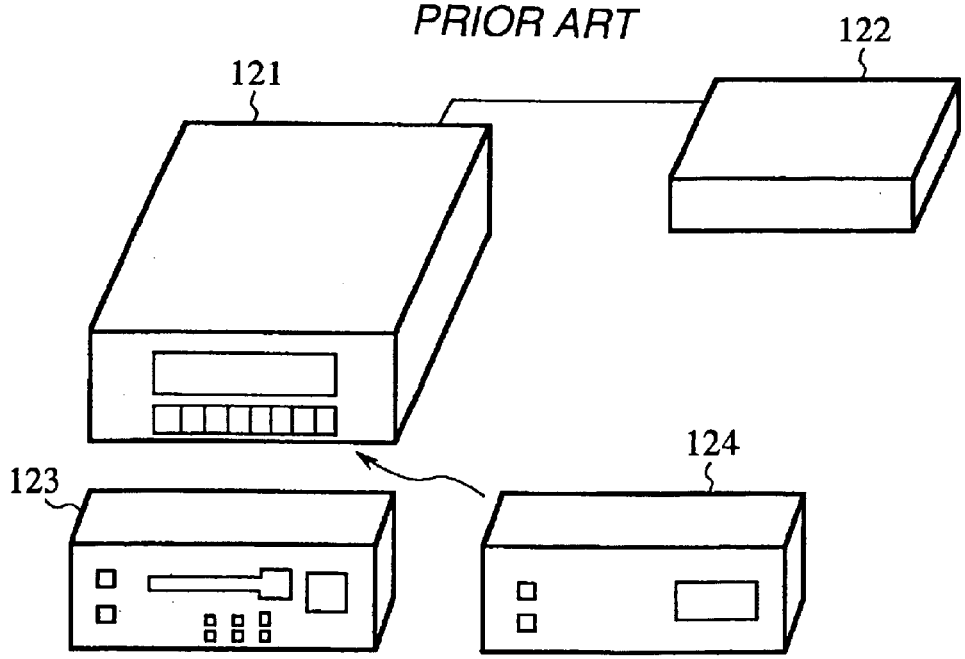
FIG. 2 is a block diagram showing an arrangement of a conventional onboard device abnormal connection notification system.
Figure 3:
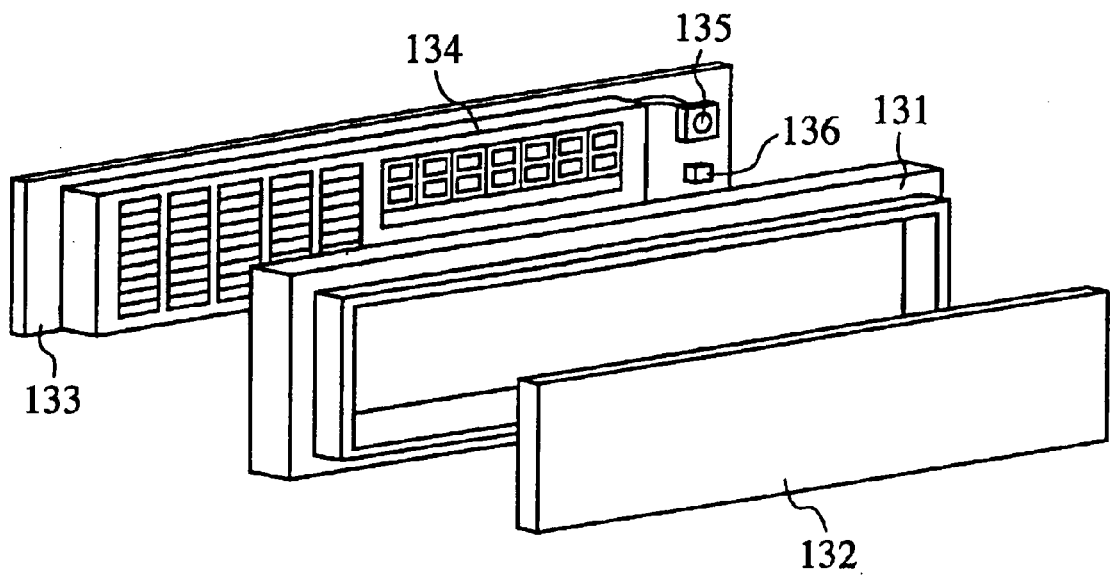
FIG. 3 is a structural view showing an arrangement of a conventional theft-deterring system for onboard devices.
Figure 4:
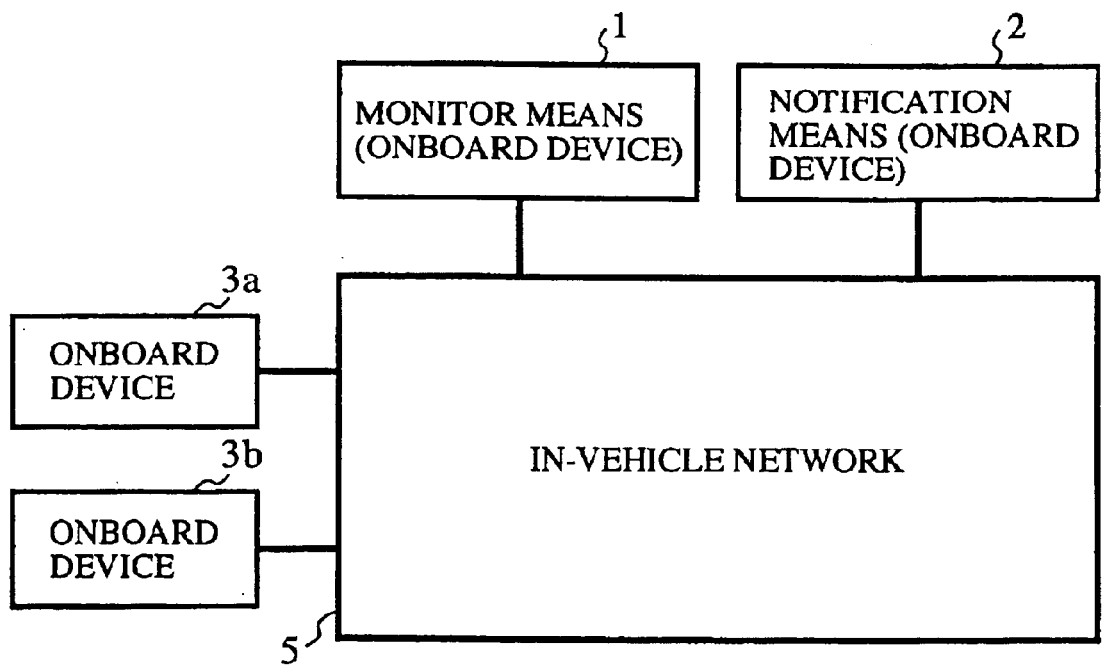
FIG. 4 is a block diagram showing an arrangement of an onboard device abnormal connection notification system according to embodiment 1 of this invention.

FIG. 4 is a block diagram showing an arrangement of an onboard (motor-vehicle-mounted) device abnormal connection notification system according to embodiment 1 of this invention. In the figure, reference numeral 1 denotes a monitor means such as an audio head unit or the like, reference numeral 2 denotes a notification means such as an automobile telephone, a mobile phone, an emergency communication system or the like, reference numerals 3a, 3b denote onboard devices such as an engine control unit (ECU), a navigation system, a compact disc (CD) changer, a mini-disc (MD) changer or the like, reference numeral 5 denotes a network inside a motor vehicle (called "an in-vehicle network") for connecting the monitor means 1, the notification means 2, and the onboard devices 3a, 3b.

Here, the audio head unit in the monitor means 1 refers to an audio device having a function for adjusting the sound volume, the balance of right and left sounds, the low-sound level, the high-sound level or the like. Further, the monitor means 1 and the notification means 2 are also treated as one of the onboard devices.

In all of the embodiments inclusive of this embodiment, the monitor means 1 is defined as a master equipment and the others such as the notification means 2 and the onboard devices 3a, 3b are defined as a slave equipment.

A description will now be given of the operation.

Figure 5:
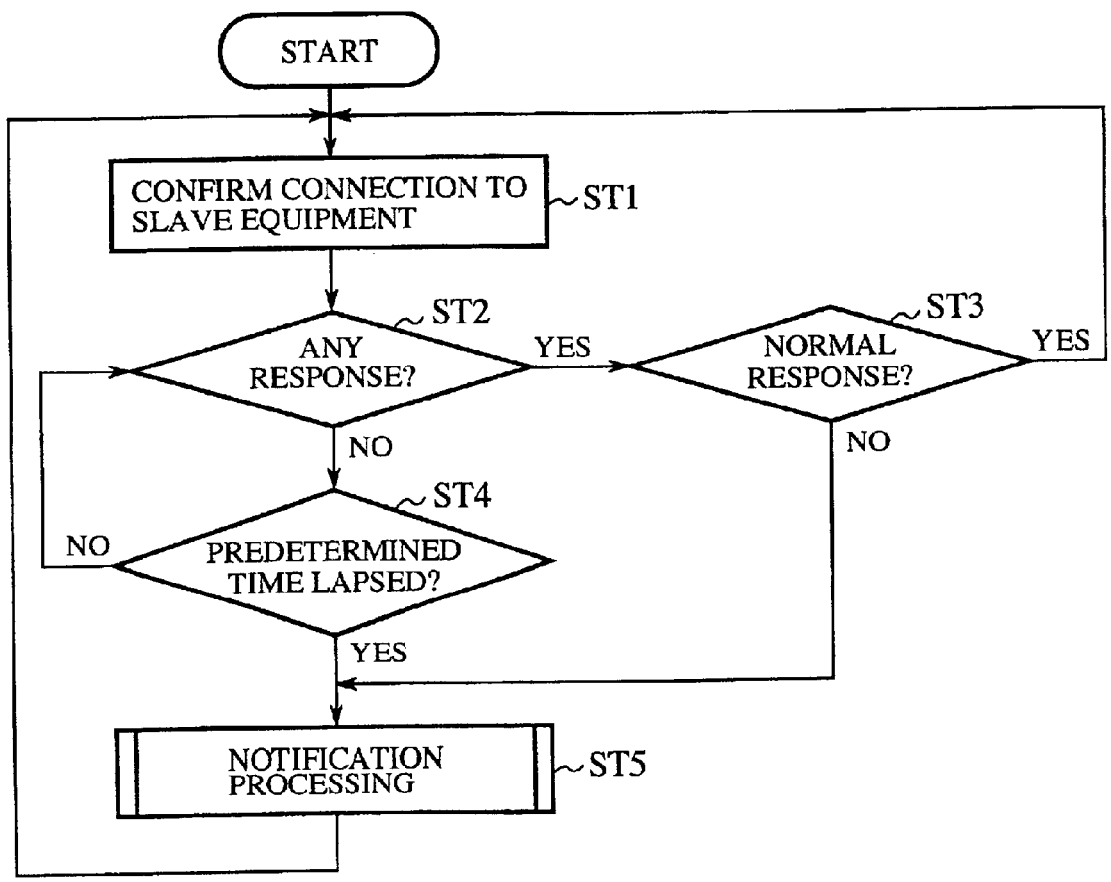
FIG. 5 is a flow chart showing the processing of onboard devices as master equipment according to embodiment 1 of this invention.

FIG. 5 is a flow chart showing the processing of the master equipment in the form of the onboard device according to embodiment 1 of this invention. At step ST1, the master equipment (the monitor means 1) demands the slave equipment (the notification means 2, the onboard devices 3a, 3b) connected to the in-vehicle network 5 to confirm the connection to the in-vehicle network 5 at every predetermined period of time. At step ST2, a confirmation is made to see whether there is a response from the slave equipment.

If a response has been confirmed at the above step ST2, a confirmation is made at step ST3 to see whether the response is a normal response (a response to the effect that the connection is "normal") or not. If the response is the normal response, the procedure returns to step ST1 to demand the slave equipment for the confirmation of connection. If the judgement at step ST3 is found to be an abnormal response (a response to the effect that the connection is "abnormal"), the procedure transfers to the notification process at step ST5 for the reason that the slave equipment is abnormal.

If a response is not confirmed at the step ST2, the time of lapse from the time when the demand for connection was made is monitored at step ST4. If a predetermined time (e.g., 100 ms) has lapsed, the procedure transfers to the processing at step ST5 for the reason that the slave equipment is abnormal. If the predetermined time has not lapsed at step ST4, the procedure returns to step ST2 to confirm the presence or absence of a reply. The processing at step ST5 will be described in detail hereinafter.

Figure 6:
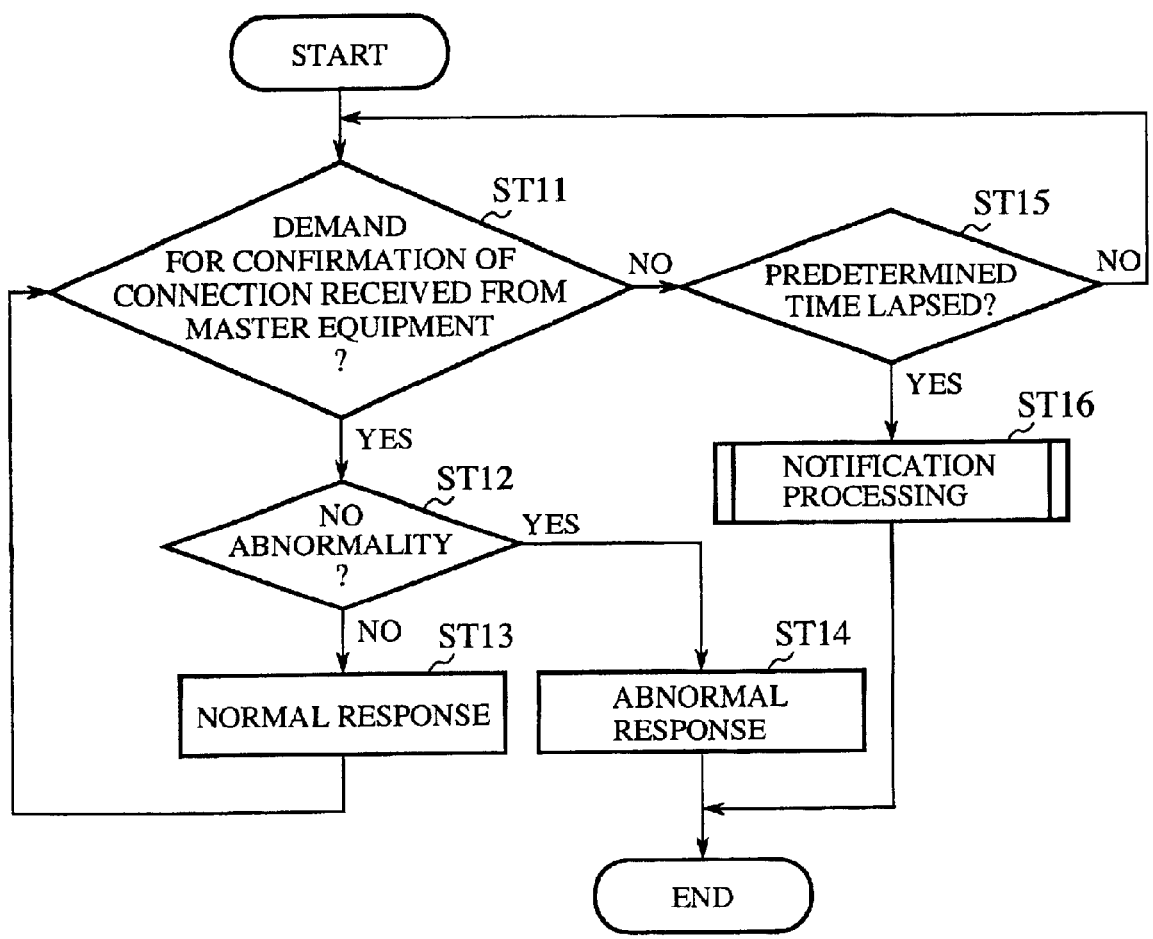
FIG. 6 is a flow chart showing the processing of onboard devices as slave equipment according to embodiment 1 of this invention.

FIG. 6 is a flow chart showing the processing of the onboard devices which are the slave equipment according to embodiment 1 of this invention.

The slave equipment (the notification means 2, the onboard devices 3a, 3b) receives at step ST11 a demand for confirmation of connection at every predetermined period of time from the master equipment (monitor means 1). If there is a demand for confirmation of connection from the master equipment, the procedure transfers to step ST12. If there is no demand for confirmation of connection, the procedure transfers to step ST15.

At step ST12, the slave equipment confirms the state of its own connection. If there is no abnormality, the procedure transfers to step ST13 and, if there is an abnormality, the procedure transfers to step ST14. The slave equipment gives the master equipment a response of normal response at step ST13 and gives the master equipment an abnormal response at step ST14.

At step ST15, the time of lapse from the time of the previous demand for connection from the master equipment is measured and confirms whether a predetermined time has lapsed or not. At step ST15, if the predetermined time has not lapsed, the procedure returns to step ST11 and keeps on waiting for the demand for confirmation of connection from the master equipment. If there is no demand for confirmation of connection even after the lapse of the predetermined time, the procedure transfers to the notification process at step ST16 for the reason that the master equipment is abnormal.

Figure 7:
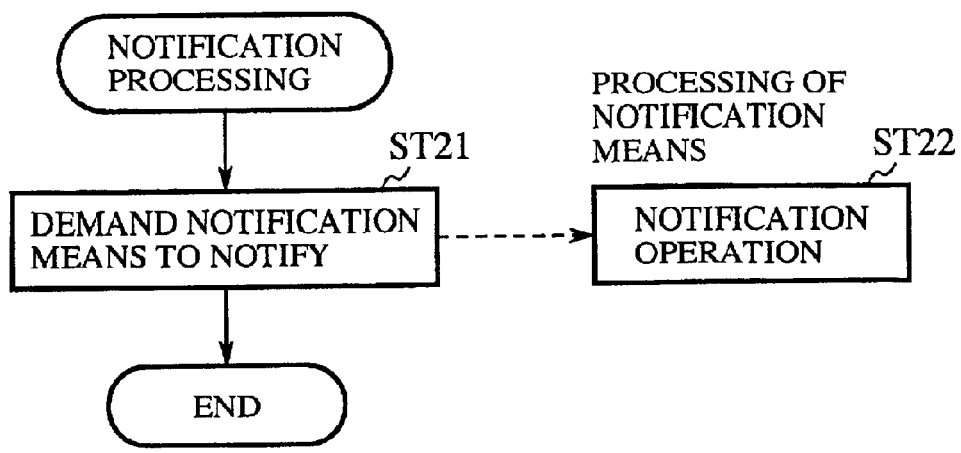
FIG. 7 is a flow chart showing the notification processing according to embodiment 1 of this invention.

FIG. 7 is a flow chart showing the notification process according to embodiment 1 of this invention. This notification process corresponds to the step ST5 in FIG. 5 and to the step ST16 in FIG. 6. At step ST21, the master equipment (the monitor means 1) or the slave equipment (the notification means 2, the onboard devices 3a, 3b) demands the notification means 2 to make a notifying operation. The notification means 2 confirms at step ST22 the demand for notification and performs the operation of notifying to the outside. For example, if the notification means 2 is an automobile telephone, a notification is made to a user thereof or the like though a telephone line.

As described above, according to embodiment 1 of this invention, the monitor means 1 which is the master equipment to confirm the state of connection of the slave equipment and the notification means 2 to notify the user of the abnormality by the demand from the master equipment or the slave equipment are connected to the in-vehicle network 5. As a result, there is obtained an effect in that the single system is capable of performing the notification of abnormality in connection of the monitor means 1 and the onboard devices 3a, 3b connected to the in-vehicle network 5, thereby performing the theft deterring.

In addition, according to embodiment 1 of this invention, even in case an onboard device is to be newly installed, there is attained an effect in that, by simply connecting it to the in-vehicle network 5, the notification of the abnormality in the connection of the newly installed onboard device is performed, with a consequent theft deterring.

Embodiment 2

Figure 8:
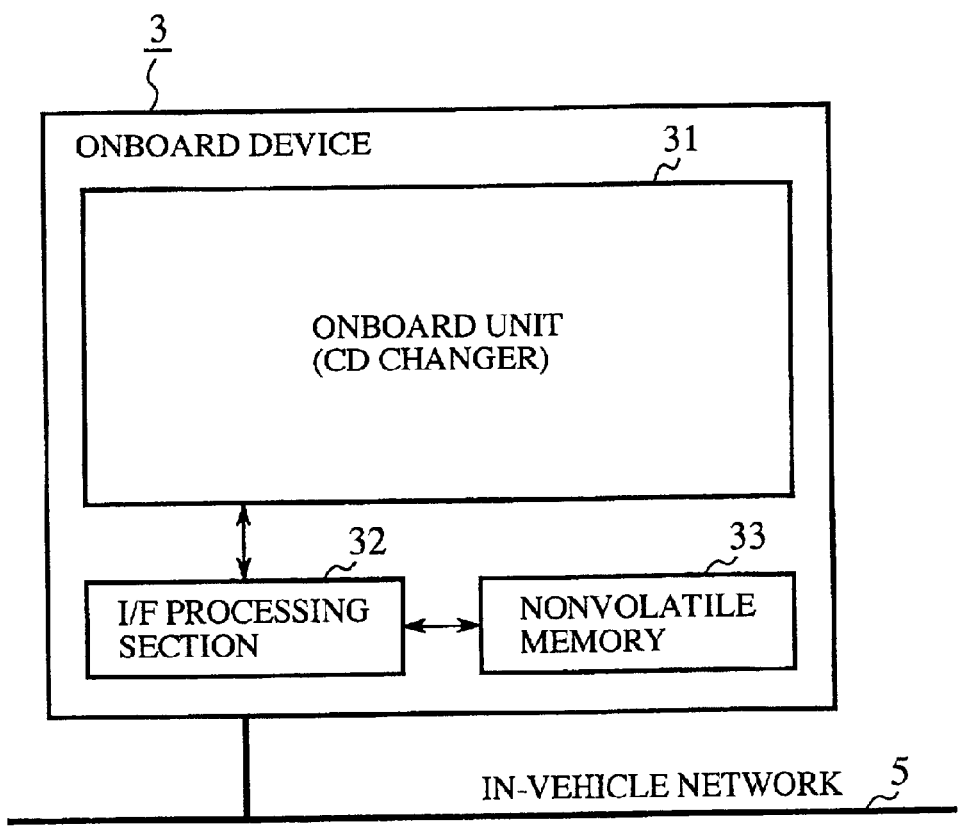
FIG. 8 is a block diagram showing an arrangement of onboard devices according to embodiment 2 of this invention.

FIG. 8 is a block diagram showing an arrangement of an onboard device according to embodiment 2 of this invention. In the figure, reference numeral 3 denotes an onboard device, reference numeral 31 denotes an onboard unit such as a CD changer or the like, reference numeral 32 denotes an interface (I/F) processing section, reference numeral 33 denotes a nonvolatile memory for storing/registering a network identification (ID) and the network information of an in-vehicle network 5. Here, the network ID means a discriminating element for discriminating the in-vehicle network 5. The network information means the name, telephone number or the like of the user.

Figure 9:
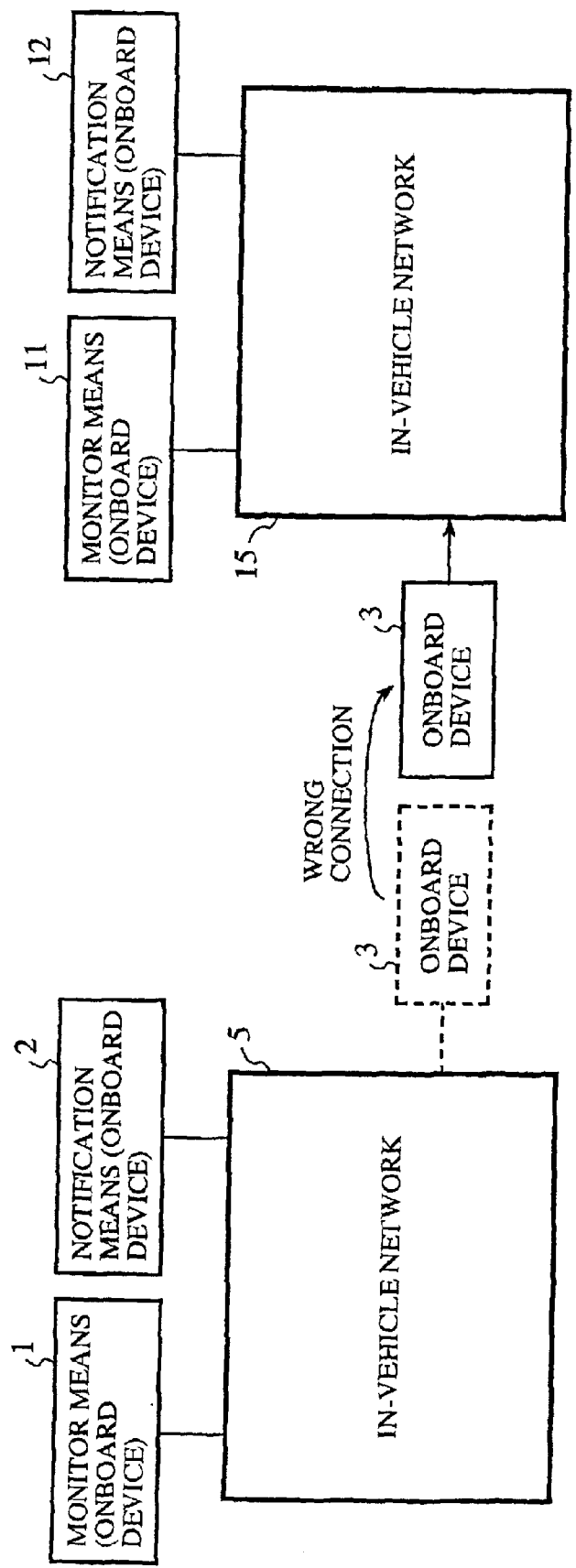
FIG. 9 is a block diagram showing an arrangement of an onboard device abnormal connection notification system according to embodiment 2 of this invention.

FIG. 9 is a block diagram showing an arrangement of an onboard device abnormal connection notification system according to embodiment 2 of this invention. In the figure, reference numeral 1 denotes a monitor means such as an audio head unit or the like, reference numeral 2 denotes a notification means such as an automobile telephone, reference numeral 3 denotes an onboard device such as a CD changer or the like and reference numeral 5 denotes an in-vehicle network to which are connected the monitor means 1, the notification means 2 and the onboard device 3.

Reference numeral 11 denotes a monitor means such as a navigation system or the like, reference numeral 12 denotes a notification means such as a mobile telephone or the like and reference numeral 15 denotes an in-vehicle network to which is connected the monitor means 11 and the notification means 12. Here is shown an example in which the onboard device 3 connected to the in-vehicle network 5 is wrongly connected to the in-vehicle network 15 of another motor vehicle.

A description will now be given of the operation.

Figure 10:
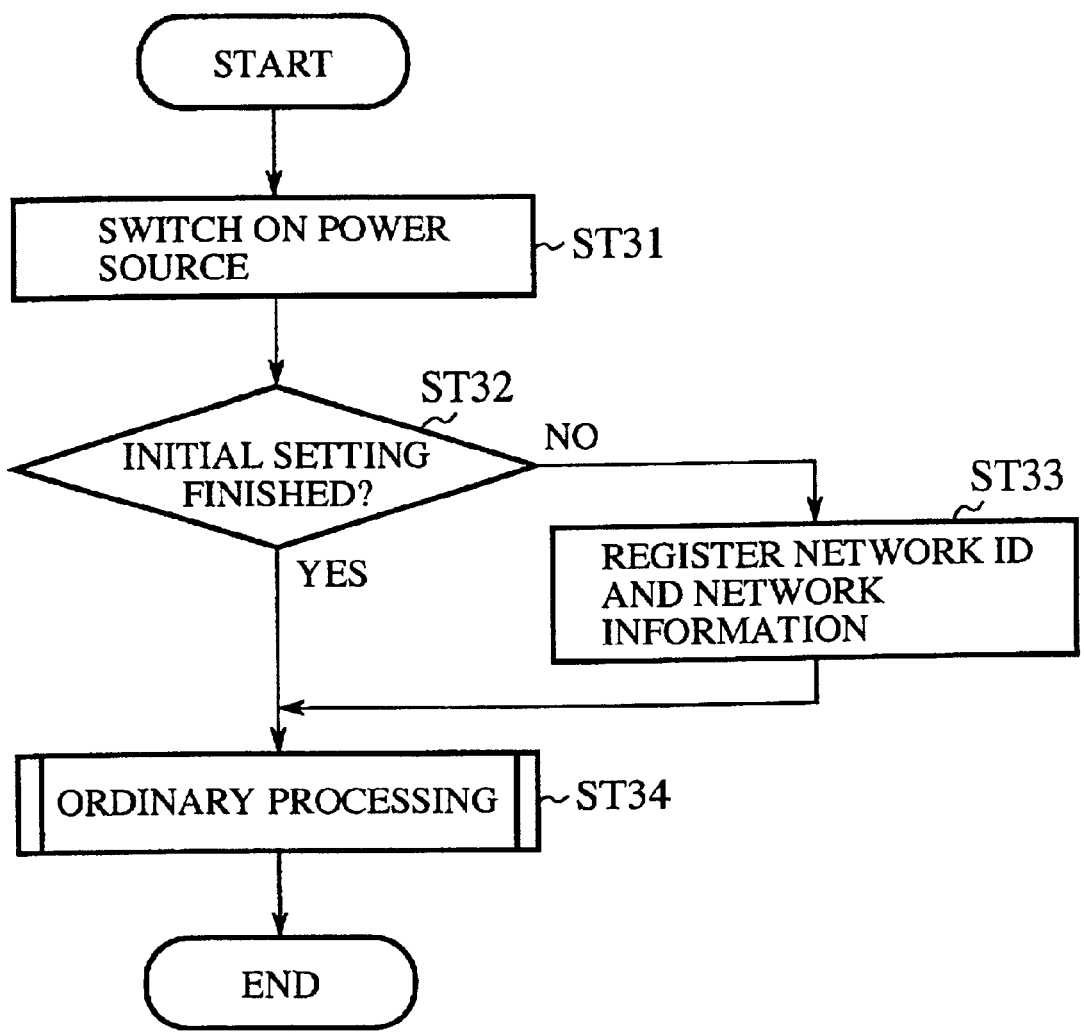
FIG. 10 is a flow chart showing an initialization processing of onboard devices according to embodiment 2 of this invention.

FIG. 10 is a flow chart showing an initial setting processing of the onboard device according to embodiment 2 of this invention. When a power switch is switched on at step ST31, the user confirms at step ST32 as to whether the network ID and the network information have been registered into a nonvolatile memory 33 in the onboard device 3, i.e., confirms as to whether an initial setting has been made or not. If the initial setting has not been made, the procedure transfers to step ST33 and, if the initial setting has been made, the procedure transfers to the ordinary processing at step ST34.

At step ST33, if the user registers, into the nonvolatile memory 33 in the onboard device 3, the network ID and the network information of the connected in-vehicle network 5 for the onboard device 3 as a newly added onboard device, the procedure transfers to an ordinary processing.

Figure 11:
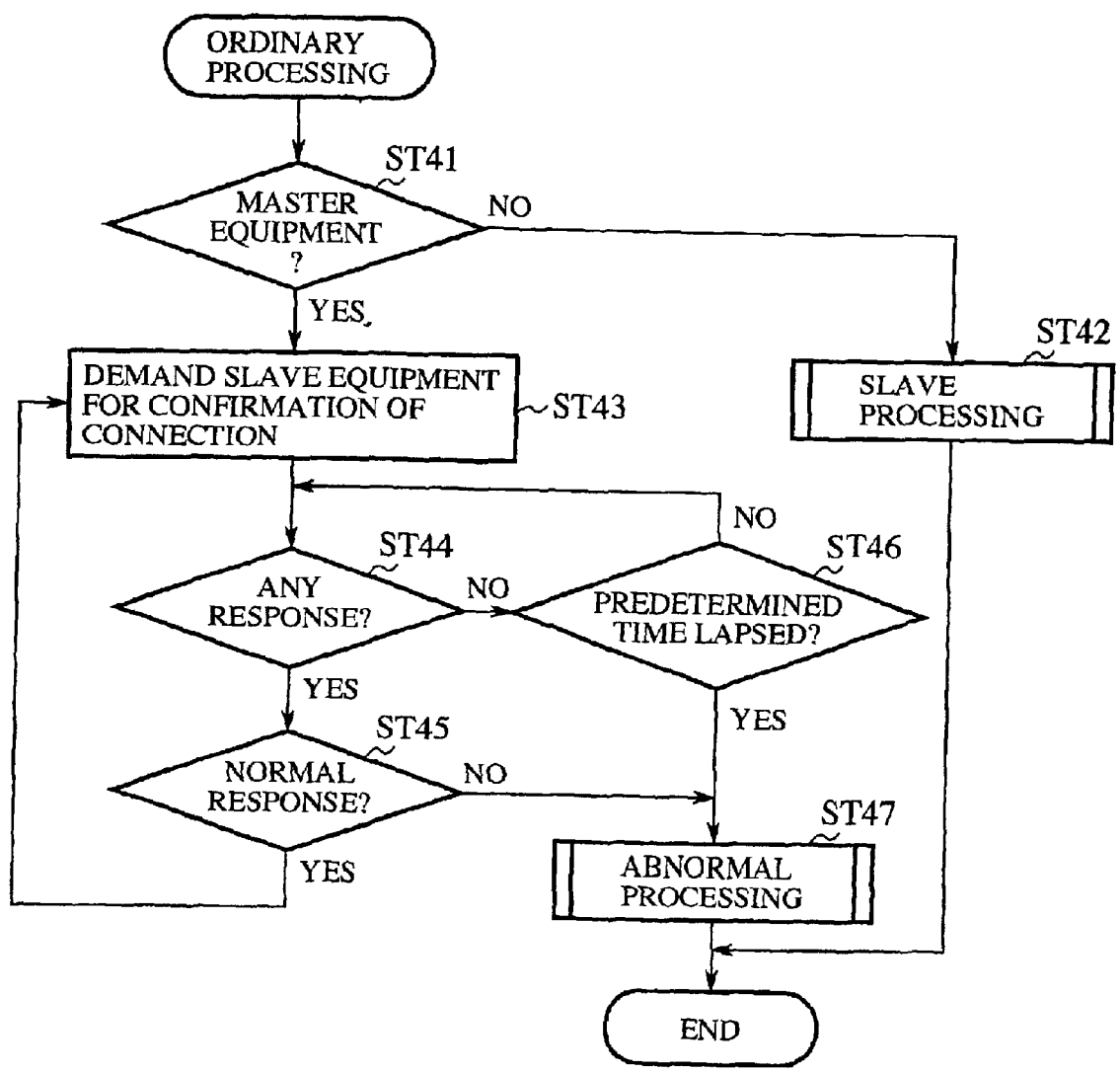
FIG. 11 is a flow chart showing a normal processing of onboard devices according to embodiment 2 of this invention.

FIG. 11 is a flow chart showing the ordinary processing of the onboard device according to embodiment 2 of this invention. At step ST41, each of the onboard devices (the monitor means 1, the notification means 2, the onboard device 3) connected to the in-vehicle network 5 judges whether it is the master equipment or the slave equipment. If it is the master equipment, the procedure transfers to step ST43 and, if it is the slave equipment, the procedure transfers to step ST42.

The judgement processing at this step ST41 is performed in the following manner. Namely, a device number is set in advance for each of the onboard devices. Each of the onboard devices grasps its own device number and the device numbers of all of the onboard devices that are connected to the in-vehicle network 5. Among the onboard devices connected to the in-vehicle network 5, the onboard device that has set thereto the smallest device number, for example, becomes the master equipment (monitor means 1).

If the device in question has been found to be the master equipment as a result of judgement at step ST41, a demand for confirmation of connection is made at step ST43 to all of the slave equipment (the notification means 2, the onboard device 3) to confirm the state of connection at every predetermined period of time. At step ST44, the master equipment confirms the presence or absence of a response. If a response has been confirmed, the procedure transfers to step ST45 and, if there is no response, the procedure transfers to step ST46.

At step ST45, a confirmation is made as to whether the response from the slave equipment is a normal response or not. If it is a normal response, the procedure returns to step ST43 and, if the response is an abnormal response, the procedure transfers to the abnormal processing (processing of "abnormal" response) at step ST47. At step ST46, the master equipment measures the time of lapse from the time of having made the demand for confirmation of connection. If the time has not exceeded the predetermined time, the procedure returns to step ST44 and, if the time has exceeded the predetermined time, the procedure transfers to the abnormal processing.

If the device in question has been found to be the slave equipment as a result of judgement at step ST41, the procedure transfers to step ST42.

The slave processing at step ST42 and the abnormal processing at step ST47 will be described hereinafter.

Figure 12:
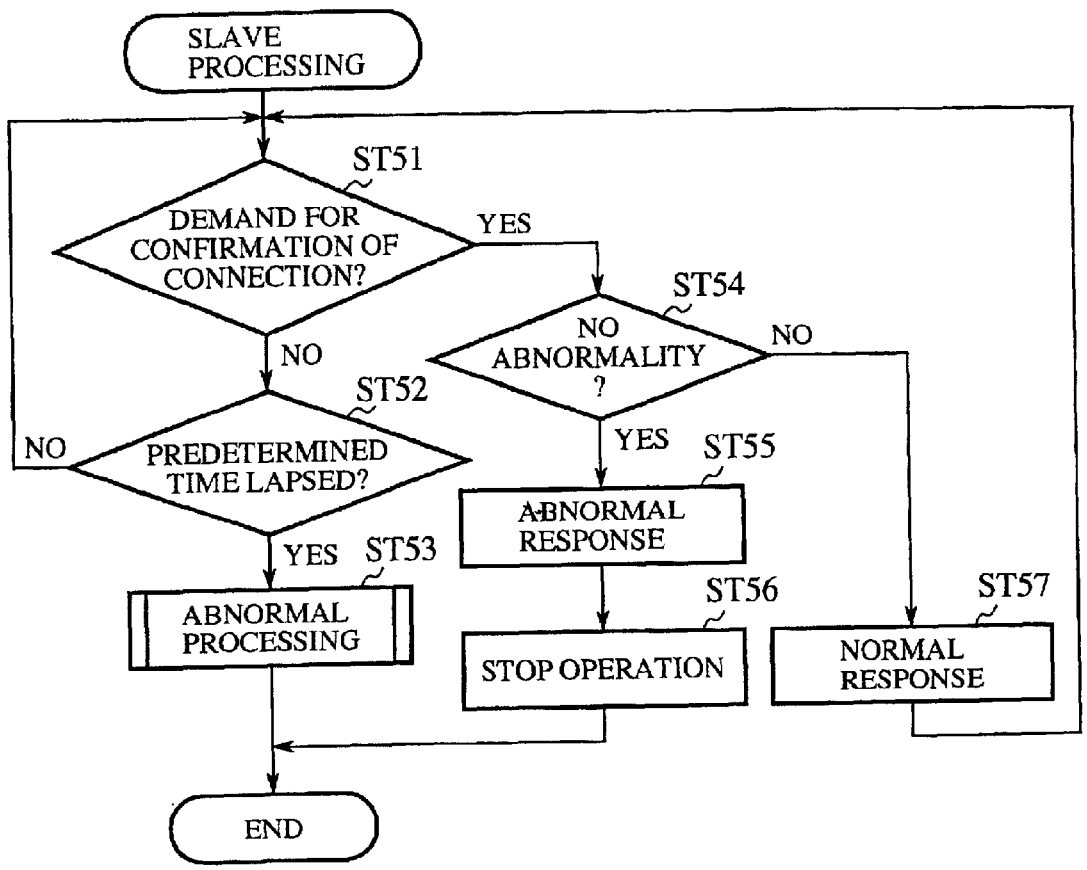
FIG. 12 is a flow chart showing a slave processing of onboard device according to embodiment 2 of this invention.

FIG. 12 is a flow chart showing a slave processing of the onboard device according to embodiment 2 of this invention. This slave processing is a processing to be done by the onboard device that has been judged to be the slave equipment at step ST41 in FIG. 11.

At step ST51, the slave equipment (the notification means 2, the onboard device 3) waits for a demand for confirmation of connection at every predetermined period of time from the master equipment (monitor means 1). If there is a response, the procedure transfers to step ST54 and, if there is no response, the procedure transfers to step ST52. At step ST52, the time of lapse from the time when the demand for confirmation of connection was made last time is measured to see whether a predetermined time (e.g., 100 ms) has lapsed. If the predetermined time has not lapsed, the procedure returns to step ST51 and, if the predetermined time has exceeded, the procedure transfers to the abnormal processing.

At step ST54, the state of connection of the slave equipment itself is confirmed. If there is no abnormality, the procedure transfers to step ST57 and, if there is an abnormality, the procedure transfers to step ST55. At step ST57, the slave equipment gives a normal response to the master equipment and the procedure returns to step ST51. At step ST55, the slave equipment gives an abnormal response to the master equipment. Since an abnormality has occurred to the slave equipment, the operation is stopped at step ST56.

Figure 13:
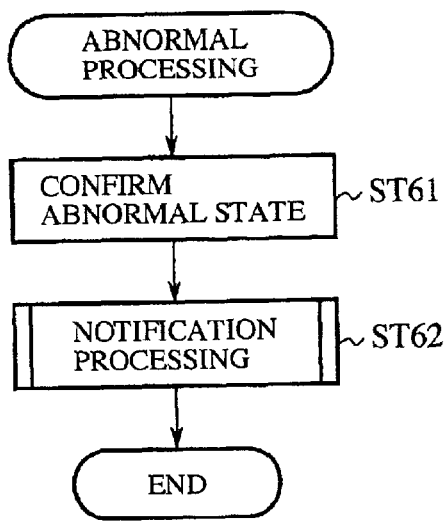
FIG. 13 is a flow chart showing an abnormal processing of onboard devices according to embodiment 2 of this invention.

FIG. 13 is a flow chart showing an abnormal processing of an onboard device according to embodiment 2 of this invention. This abnormal processing is a processing which corresponds to step ST47 in FIG. 11 and step ST53 in FIG. 12.

At step ST61, the master equipment (monitor means 1) or the slave equipment (notification means 2, onboard device 3) confirms an abnormal state and, at step 62, a notification process is performed. This notification process is the same as the notification process shown in FIG. 7 in embodiment 1; the notification means 2 performs the notifying operation in response to the demand for notification. For example, when a beeper is employed, the beeper is sounded to notify the user. When an automobile telephone/cellular phone is employed, a notification is made to the user or to the designated place through the telephone line together with the abnormal state confirmed at step ST61.

Figure 14:
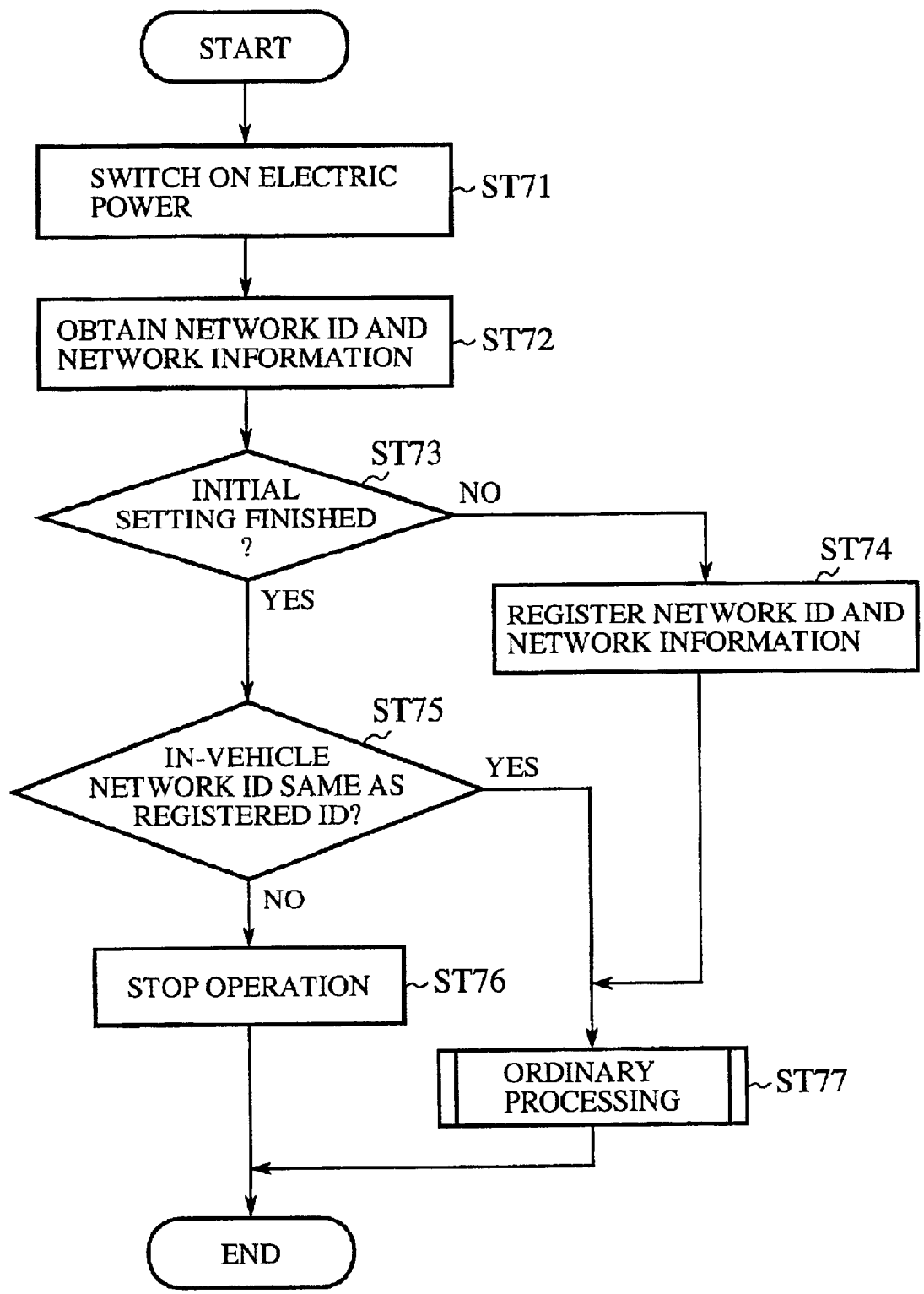
FIG. 14 is a flow chart showing a processing of wrong use prevention according to embodiment 2 of this invention.

FIG. 14 is a flow chart showing the processing to prevent the wrong use in embodiment 2 of this invention. This processing to prevent the wrong use is, as shown in FIG. 9, a processing when the onboard device 3 connected to the in-vehicle network 5 is wrongly connected to the in-vehicle network 15 in another motor vehicle.

After switching on the electric power at step ST71, the onboard device 3 obtains from the monitor means 11 at step ST72 the network ID and the network information of the connected in-vehicle network 15. At step ST73, the onboard device 3 confirms whether an initial setting has been finished or not by confirming whether the network ID and the network information have been registered in the nonvolatile memory 33. If the registration has not been made, the procedure transfers to step ST74 and, if the registration has been finished, the procedure transfers to step ST75.

At step ST75, the onboard device 3 confirms whether the obtained network ID of the in-vehicle network 15 is the same as the network ID that is registered in the nonvolatile memory 33 in the onboard device 3 itself. If they are the same, the procedure transfers to the ordinary processing at step ST77 and, if they are not the same, the procedure transfers to step ST76. At step ST76, the onboard device 3 stops operation based on a judgement that it is the wrong use because the network ID is different. In other words, the example shown in FIG. 9 is a wrong connection and, therefore, the onboard device 3 does not operate even if it is connected to the in-vehicle network 15. After the operation is stopped, the notification process as shown in FIG. 7 of embodiment 1 may also be performed.

In case the initial setting has not been made at step ST73, the user registers/memorizes the network ID and the network information of the in-vehicle network 15 at step ST74, and the procedure transfers to the ordinary processing at step 77. The ordinary processing at step ST77 is the same as the ordinary processing as shown in FIG. 11.

As described above, according to embodiment 2, there is obtained an effect in that, by setting the network ID to the in-vehicle network of each motor vehicle, the wrong use of the onboard device 3 in another motor vehicle is restricted.

Embodiment 3

Figure 15:
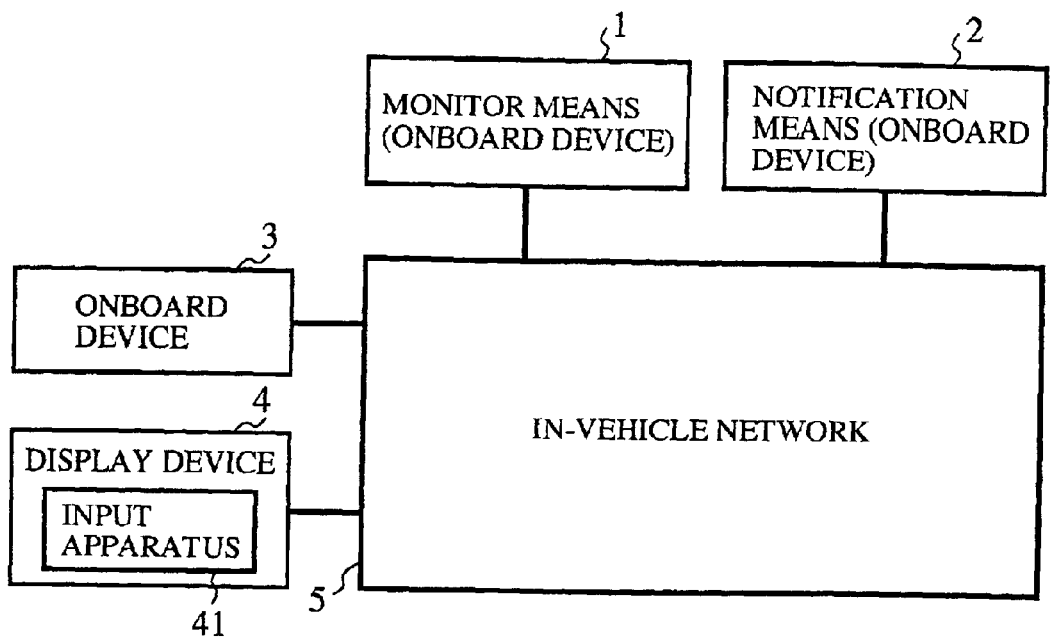
FIG. 15 is a block diagram showing an arrangement of an onboard device abnormal connection notification system according to embodiment 3 of this invention.

FIG. 15 is a block diagram showing an arrangement of an onboard device abnormal connection notification system according to embodiment 3 of this invention. In the figure, reference numeral 1 denotes a monitor means, reference numeral 2 denotes a notification means, reference numeral 3 denotes an onboard device and reference numeral 4 denotes a display device such as a display which is equipped with an input apparatus 41. The monitor means 1, the notification means 2, the onboard device 3 and the display device 4 are connected to the in-vehicle network 5.

A description will now be given of the operation.

Figure 16:
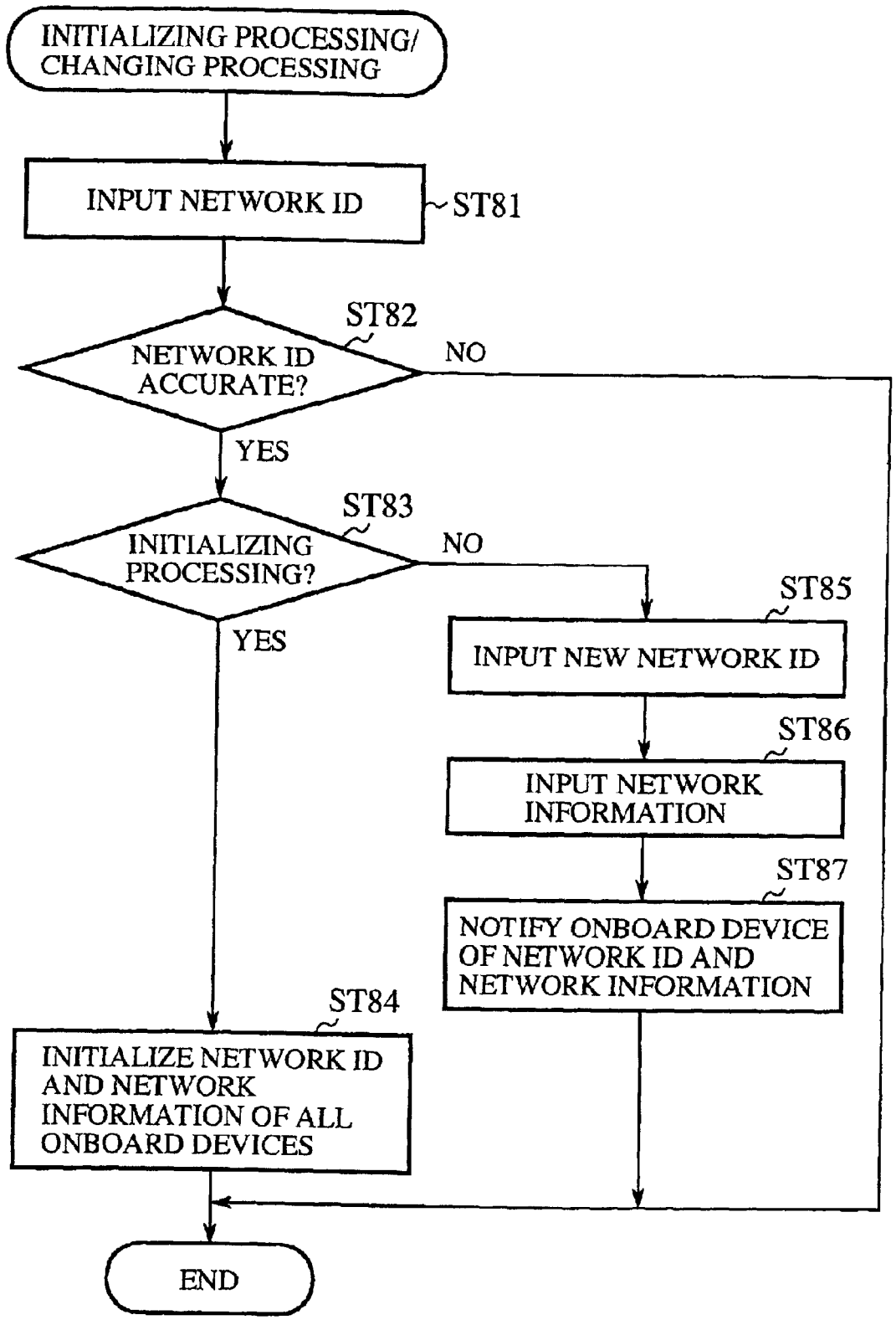
FIG. 16 is a flow chart showing an initialization processing/changing processing of a network identification and a network information of onboard devices according to embodiment 3 of this invention.

FIG. 16 is a flow chart showing the initializing processing/changing processing of the network ID and the network information of the onboard devices in embodiment 3 according to this invention. At step ST81 the user inputs the network ID by the input apparatus 41 provided in the display device 4. This inputting of the network ID is performed to judge whether the user has the right to perform the initializing processing/changing processing.

At step ST82, the input apparatus 41 in the display device 4 confirms whether the inputted network ID coincides with the network ID of the in-vehicle network 5 to which the display device 4 is connected. If the network ID does not coincide, this initializing processing/changing processing cannot be performed, resulting in stopping of the processing. If they coincide with each other, the procedure transfers to step ST83.

At step ST83, the user confirms whether the initializing processing is to be made or not. If the initializing processing otherwise, namely, if the changing processing shall be made, the procedure transfers to step ST85. At step ST84, the user initializes the network ID and the network information of all the onboard devices (the monitor means 1, the notification means 2, the onboard device 3) connected to the in-vehicle network 5, and stops the operation of all the onboard devices until the electric power is switched on again. By removing the onboard devices from the in-vehicle network 5 by the time when the electric power is switched on again, they can be connected to the in-vehicle network of another motor vehicle.

For the purpose of security, the user inputs at step ST85 the new network ID by the input apparatus 41 in the display device 4, thereby changing the network ID in the in-vehicle network 5. At step ST86, the user inputs the new network information by the input apparatus 41 in the display device 4.

At step ST87, the display device 4 demands all the onboard devices (the monitor means 1, the notification means 2, the onboard device 3) connected to the in-vehicle network 5 to re-register the network ID and the network information in the in-vehicle network 5 which are registered in each of the nonvolatile memories 33. Then, all of the onboard devices connected to the in-vehicle network 5 change the network ID and the network information.

As described above, according to embodiment 3, by initializing the network ID and the network information which are registered in the onboard device, there is obtained an effect in that the onboard device can be used in another motor vehicle.

Further, according to embodiment 3, by setting a new network ID of the in-vehicle network 5 to the onboard device, there is obtained an effect in that the secrecy of the network ID is enhanced.

Embodiment 4

Figure 17:
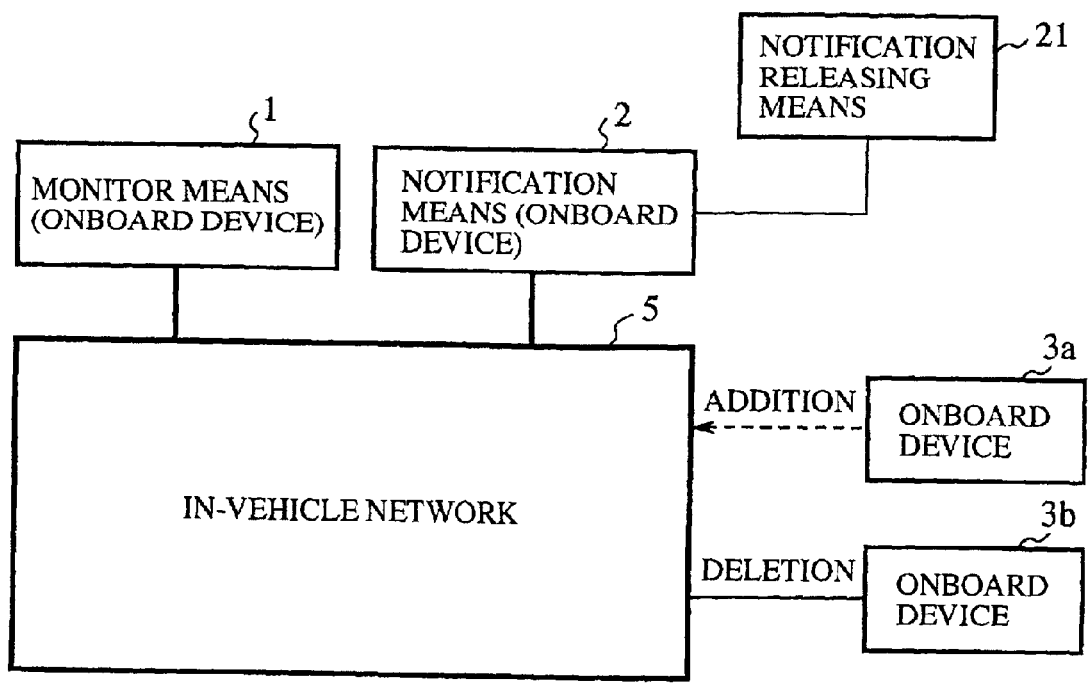
FIG. 17 is a block diagram showing an arrangement of an onboard device abnormal connection notification system according to embodiment 4 of this invention.

FIG. 17 is a block diagram showing an arrangement of an onboard device abnormal connection notification system according to embodiment 4 of this invention. In the figure, reference numeral 1 denotes a monitor means such as an audio head unit or the like, reference numeral 2 denotes a notification means such as a cellular phone or the like, reference numeral 21 denotes a notification releasing means such as by means of a switch or the like for temporarily releasing the function of the notification means 2, reference numerals 3a, 3b denote onboard devices such as a CD changer, a navigation system or the like. The monitor means 1, the notification means 2 and the onboard device 3b are connected to the in-vehicle network 5.

A description will now be given of the operation.

In order to prevent an unnecessary notifying operation by the notification means 2 when the onboard device 3a is newly added to the in-vehicle network 5, or when the onboard device 3b is removed from the in-vehicle network 5 due to repairing or the like of the onboard device 3b, there is disposed, in a hardly visible place, the notification releasing means 21 for temporarily releasing the notifying operation of the notification means 2. In case the addition/deletion to and from the in-vehicle network 5 of the onboard devices 3a, 3b is made, the notifying operation of the notification releasing means 2 is temporarily stopped by operating the notification releasing means 21.

As described above, according to embodiment 4, by providing the notification releasing means 21 for temporarily stopping the notifying operation of the notification means 2, there is obtained an effect in that unnecessary notifying operation of the notification means 2 can be prevented in case the new onboard device 3a is added to the in-vehicle network 5 or in case the unnecessary onboard device 3b is deleted from the in-vehicle network 5.

Embodiment 5

Figure 18:
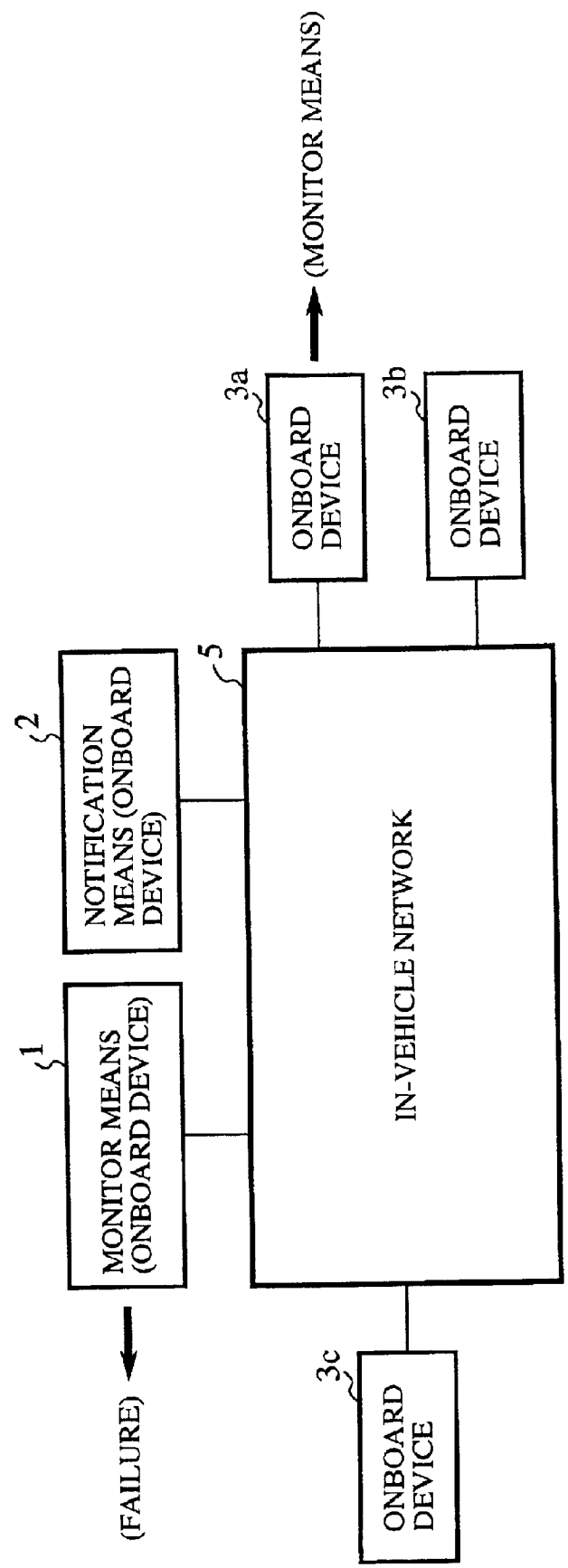
FIG. 18 is a block diagram showing an arrangement of an onboard device abnormal connection notification system according to embodiment 5 of this invention.

FIG. 18 is a block diagram showing an arrangement of an onboard device abnormal connection notification system according to embodiment 5 of this invention. In the figure, reference numeral 1 denotes a monitor means, reference numeral 2 denotes a notification means, and reference numerals 3a, 3b, 3c denote onboard devices. The monitor means 1, the notification means 2 and the onboard devices 3a, 3b, 3c are connected to an in-vehicle network 5.

Now, a description will be given of the operation.

Figure 19:
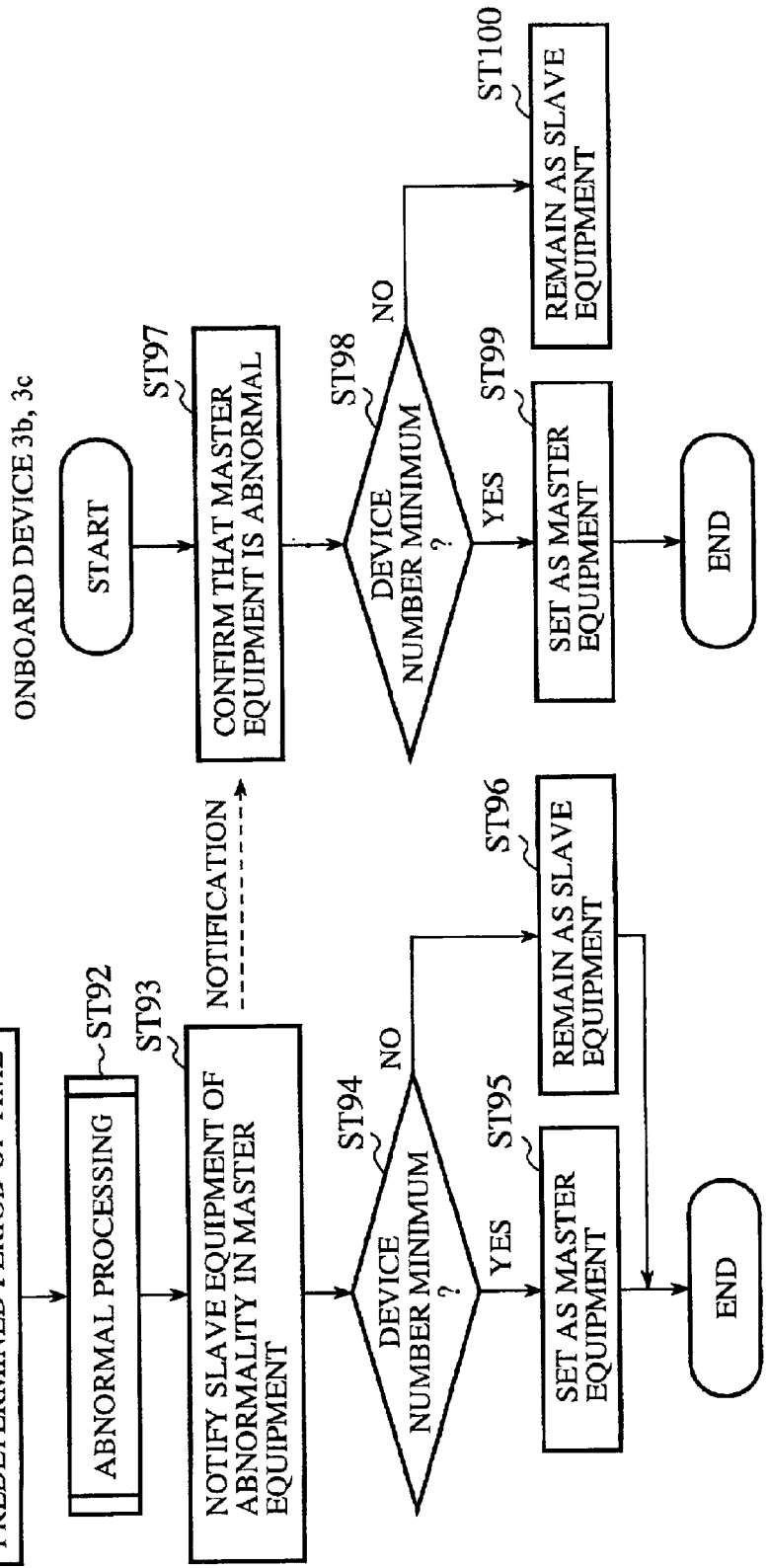
FIG. 19 is a flow chart showing the processing of an onboard device abnormal connection notification system according to embodiment 5 of this invention.

FIG. 19 is a flow chart showing the processing of the onboard device abnormal connection notification system according to embodiment 5 of this invention. It shows the processing of maintaining the onboard device abnormal connection notification system in case the monitor means 1 as the master equipment fails.

While the abnormal connection notification system is in operation, the onboard device 3a recognizes at step ST91 that there is no demand for confirmation of connection from the monitor means 1 as the master equipment at every predetermined period of time. Then, the onboard device 3a judges, at step ST92, that the monitor means 1 as the master equipment is abnormal, thereby performing the abnormal processing. This abnormal processing is the same as the processing as shown in FIG. 13.

The onboard device 3a which has recognized the occurrence of an abnormality in the master equipment notifies the slave equipment (the notification means 2, the onboard devices 3b, 3c) connected to the in-vehicle network 5 of the abnormality of the master equipment at step ST93.

Then, in order to determine a new master equipment so as to continue the abnormal connection notification system, the onboard device 3a confirms at step ST94 as to whether its own device number that has been set in advance is the smallest in the in-vehicle network 5. If the device number is the smallest, the procedure transfers to step ST95 and, if the device number is not the smallest, the procedure transfers to step ST96. In this case, it is to be understood that all the onboard devices (the monitor means 1, the notification means 2, the onboard devices 3a, 3b, 3c) connected to the in-vehicle network 5 grasp in advance the device numbers of all the onboard devices.

At step ST95, since the device number is the smallest, the onboard device 3a is set so as to operate as the master equipment. This setting is performed, by means of software, by making effective the monitor processing for confirming the state of connection of the slave equipment at every predetermined period of time. At step ST96, since the device number is not the smallest, the onboard device 3a remains to be the setting as the slave equipment.

The onboard devices 3b, 3c that have been notified, at step ST93, of the abnormality in the monitor means 1 as the master equipment confirms, at step ST97, that the master equipment is abnormal. At step ST98, the onboard device 3b, 3c confirms as to whether its own device number that has been set in advance is the smallest or not. If it is the smallest, the procedure transfers to step ST99 and, if it is not the smallest, the procedure transfers to step ST100.

At step ST99, the onboard device 3b or the onboard device 3c is set so as to operate as the master equipment because the device number is the smallest. This setting is the same as the setting of the onboard device 3a at step ST95. At step ST100, the onboard device 3b, 3c remains to be the same setting as before as the slave equipment because the device number is not the smallest.

As described above, according to embodiment 5, it is possible for all the onboard devices connected to the in-vehicle network 5 to become the master equipment to perform the monitor operation. Therefore, even when the master equipment fails for some reason or other, there can be obtained an effect in that the processing of notifying the abnormality in connection can still be made.

Embodiment 6

Figure 20:
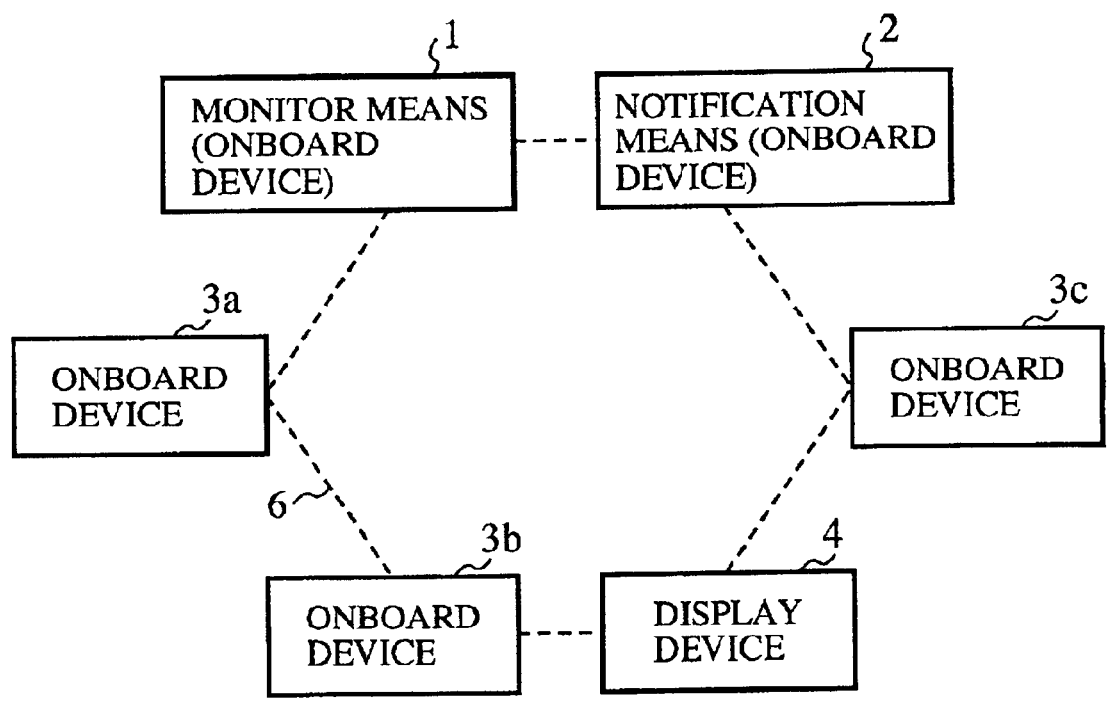
FIG. 20 is a block diagram showing an arrangement of an onboard device abnormal connection notification system according to embodiment 6 of this invention.

FIG. 20 is a block diagram showing an onboard device abnormal connection notification system according to embodiment 6 of this invention. In the figure, reference numeral 1 denotes a monitor means, reference numeral 2 denotes a notification means, reference numerals 3a, 3b, 3c denote onboard devices, reference numeral 4 denotes a display device and reference numeral 6 denotes an in-vehicle network which wirelessly connects the monitor means 1, the notification means 2, the onboard devices 3a, 3b, 3c and the display device 4.

A description will now be given of the operation.

In embodiment 6, the same processing as in the above-described embodiment 1 through the embodiment 5 is performed. The I/F processing section 32 to which is connected each of the onboard devices as shown in FIG. 8 in embodiment 2 is arranged to be a wirelessly transmitting means.

As described above, according to embodiment 6, by arranging the I/F processing portion 32 of each of the onboard devices by wirelessly transmitting means, there is obtained an effect in that the wiring for connecting each of the onboard devices is not required.

In the above embodiment 1 through embodiment 6, the network topology of the in-vehicle network 5, 6 is of a ring type. The network topology of a bus type or of a star type may also used.

INDUSTRIAL APPLICABILITY

As described above, the onboard device abnormal connection notification system and the onboard device according to this invention enables a single system to notify the abnormality to a plurality of onboard devices and are also suitable for the one which enables them to be applicable to a case in which the onboard device is newly disposed.

What is claimed is:

1. An onboard device abnormal connection notification system comprising:

an onboard device connected to an in-vehicle network;

a monitor means connected to said in-vehicle network for monitoring an abnormality in a state of connection of said onboard device to said in-vehicle network; and a notification means connected to said in-vehicle network for notifying, based on a demand from said monitor means, the abnormality in the state of connection of said onboard device;

wherein said monitor means demands said onboard device to confirm the connection thereof to said in-vehicle network and, if there is no response from said onboard device within a lapse of a predetermined period of time, demands said notification means to notify the abnormality.

2. An onboard device abnormal connection notification system comprising:

an onboard device connected to an in-vehicle network;

a monitor means connected to said in-vehicle network for monitoring an abnormality in a state of connection of said onboard device to said in-vehicle network; and a notification means connected to said in-vehicle network for notifying, based on a demand from said monitor means, the abnormality in the state of connection of said onboard device;

wherein said monitor means demands said onboard device to confirm the connection thereof to said in-vehicle network at every predetermined period of time, and wherein said onboard device notifies said notification means of the abnormality in the state of connection of said monitor means if there is no demand for confirmation of connection from said monitor means at said every predetermined period of time.

3. The system according to claim 1, further comprising a notification releasing means for temporarily releasing a notifying operation of said notification means.

4. An onboard device abnormal connection notification system comprising:

an onboard device connected to an in-vehicle network;

a monitor means connected to said in-vehicle network for monitoring an abnormality in a state of connection of said onboard device to said in-vehicle network; and a notification means connected to said in-vehicle network for notifying, based on a demand from said monitor means, the abnormality in the state of connection of said onboard device;

wherein a network identification (ID) for discriminating said in-vehicle network is registered in said monitor means and said onboard device, and wherein, when said onboard device is connected to said in-vehicle network to which said monitor means is connected, said onboard device obtains from said monitor means a network ID in said connected in-vehicle network, compares the registered network ID with the obtained network ID, and stops the operation of said onboard device if the two ID's are different from each other.

5. The system according to claim 4, wherein said onboard device comprises a nonvolatile memory for registering therein the network ID.

6. The system according to claim 4, wherein, when a display device equipped with an input apparatus for inputting the network ID is connected to said in-vehicle network and when the network ID is inputted into said input apparatus, said display device notifies the inputted network ID to said monitor means, said notification means and said onboard device connected to said in-vehicle network.

7. An onboard device abnormal connection notification system comprising:

an onboard device connected to an in-vehicle network;

a monitor means connected to said in-vehicle network for monitoring an abnormality in a state of connection of said onboard device to said in-vehicle network; and a notification means connected to said in-vehicle network for notifying, based on a demand from said monitor means, the abnormality in the state of connection of said onboard device;

wherein a device number is set in advance to said onboard device connected to said in-vehicle network, wherein said onboard device grasps all the device numbers of onboard devices connected to said in-vehicle network, and wherein an onboard device, among the onboard devices to be connected to said in-vehicle network, having a smallest device number operates as said monitor means.

8. The system according to claim 7, wherein said monitor means demands said onboard device for confirmation of connection to said in-vehicle network at every predetermined period of time and wherein, if there is no demand for confirmation of connection from said monitor means at said every predetermined period of time, an onboard device that has set thereto a smallest number exclusive of the device number of said monitor means among the onboard devices connected to said in-vehicle network operates as a new monitor means.

9. The system according to claim 1, wherein said in-vehicle network is wirelessly connected.

10. The system according to claim 9, wherein said onboard device comprises an interface (I/F) processing section for connection to said in-vehicle network, and wherein said I/F processing section is made of a wirelessly transmitting means.

11. An onboard device connected to an in-vehicle network having connected thereto an abnormal connection notification means, characterized in that, in order to notify to said notification means of an abnormality from a monitor means connected to said in-vehicle network, upon receipt of a demand for confirmation of connection to said in-vehicle network, a state of connection is confirmed and reported to said monitor means, wherein, if there is no demand for confirmation of connection from said monitor means at every predetermined period of time, the abnormality in state of connection of said monitor means is notified to said notification means.

12. An onboard device connected to an in-vehicle network having connected thereto an abnormal connection notification means, characterized in that, in order to notify to said notification means of an abnormality from a monitor means connected to said in-vehicle network, upon receipt of a demand for confirmation of connection to said in-vehicle network, a state of connection is confirmed and reported to said monitor means, wherein a network identification (ID) for discriminating said in-vehicle network is registered, and wherein, when said onboard device is connected to said in-vehicle network to which is connected said monitor means having registered therein a network ID, the network ID of said connected in-vehicle network is obtained from said monitor means, the registered network ID is compared with the obtained network ID, and the operation of said onboard device is stopped if the two ID's are different from each other.

13. The onboard device according to claim 12, further comprising a nonvolatile memory for registering the network ID.

14. An onboard device connected to an in-vehicle network having connected thereto an abnormal connection notification means, characterized in that, in order to notify to said notification means of an abnormality from a monitor means connected to said in-vehicle network, upon receipt of a demand for confirmation of connection to said in-vehicle network, a state of connection is confirmed and reported to said monitor means, wherein a device number set in advance to each of onboard devices connected to said in-vehicle network is grasped, and wherein a device, among the onboard devices to be connected to said in-vehicle network, having a smallest device number operates as said monitor means.

15. The onboard device according to claim 14, wherein, if there is no demand for confirmation of connection from said monitor means at said every predetermined period of time, an onboard device that has set thereto the smallest number exclusive of the device number of said monitor means among the onboard devices connected to said in-vehicle network operates as a new monitor means.

16. The onboard device according to claim 11, further comprising an interface (I/F) processing section for connection to said in-vehicle network, and wherein said I/F processing section is made of a wirelessly transmitting means.

* * * * *